United States Patent [19]

Gaston

[11] Patent Number: 4,685,717
[45] Date of Patent: Aug. 11, 1987

[54] AFFIXING MEANS

[75] Inventor: Ronald Gaston, Banksia Park, Australia

[73] Assignee: Kim Garfield Aunger, Netherby, Australia

[21] Appl. No.: 521,823

[22] Filed: Aug. 10, 1983

[30] Foreign Application Priority Data

Aug. 10, 1982 [AU] Australia ............... PF5309

[51] Int. Cl.⁴ .................................. B60J 3/00
[52] U.S. Cl. ................... 296/97 A; 52/473; 403/408.1
[58] Field of Search .......... 296/97 A, 97 R, 218, 296/216; 52/473; 49/61-64; 403/408, 348; 24/297, 289, 295

[56] References Cited

U.S. PATENT DOCUMENTS

| 4,023,309 | 5/1977 | Backward | 296/97 A |
| 4,081,937 | 4/1978 | Koch | 296/97 A |
| 4,412,698 | 11/1983 | Kingsley | 296/97 A |
| 4,453,762 | 6/1984 | Deaver | 296/97 A |
| 4,469,366 | 9/1984 | Deaver | 296/97 A |

FOREIGN PATENT DOCUMENTS 0006332 9/1980 European Pat. Off. .

Primary Examiner—Robert R. Song
Attorney, Agent, or Firm—Cushman, Darby & Cushman

[57] ABSTRACT

Means for attaching a moulded plastic louvre onto a rear window of a motor vehicle including an attachment member to be adhered to the external surface of the glass of the rear window and a releasable member which engages with resilient clamping pressure and over-size aperture in the perimeter of the louvre article. An attachment member includes a lip portion to engage between a resilient surround and the glass of the rear window to assist in anchorage and there are means to assist in location accurately of the attachment member with respect to the various location apertures in perimeter of the louvre article.

4 Claims, 8 Drawing Figures

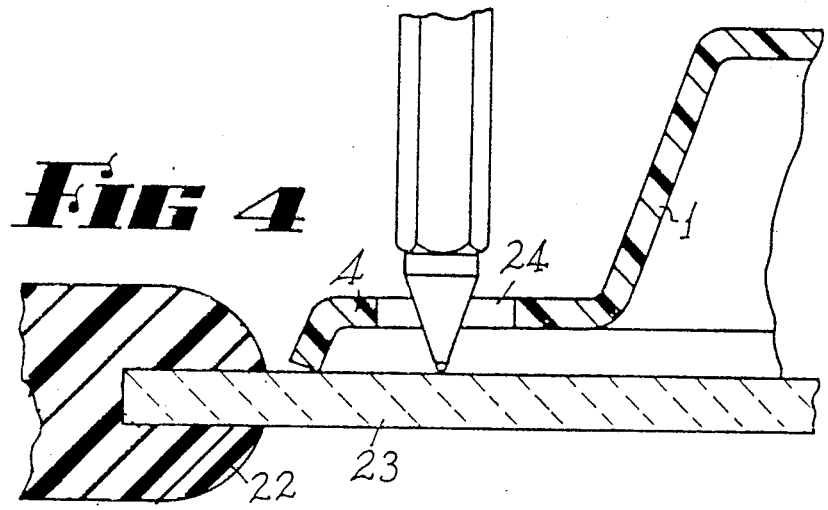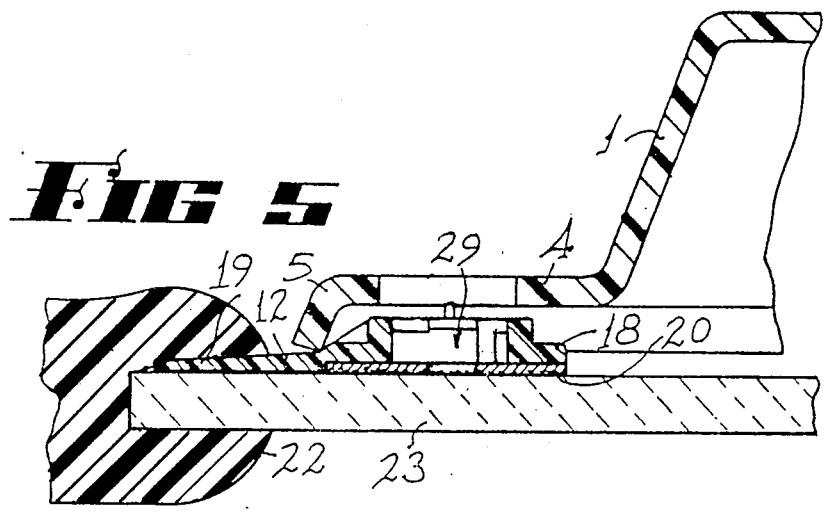

AFFIXING MEANS

This invention relates to affixing of plastic externally moulded articles providing louvres to the rear window of a motor vehicle.

BACKGROUND OF THE INVENTION

It is now known to provide a moulded plastic article which is formed to provide louvres which are shaped so as to provide shade but at the same time vision through a rear window of a motor vehicle for the driver, and such an article is attached to locate across the external face of such a rear window of a vehicle.

The attachment of such an article is difficult.

A first difficulty is that a conventional method of attachment includes the location of clips effectively permanently secured around a periphery of the moulded article which clips have a tongue which is adapted to fit beneath a resilient surround of the rear window of the motor vehicle.

The moulded articles for economic reasons are formed from plastic sheet which can be prone to twisting and bending and this can result in the clips being very easily dislodged from a fixing location between the surrounding rubber and the outer surface of the glass of the rear window.

This dislodgement can also easily occur by reason of a thief pulling the rear window louvre from the vehicle or by reason of substantial wind gusts, where the rear window louvre can be pulled with considerable force.

Such wind gusts can occur in such instances as where a motor vehicle is passing a large semi-trailer on a road.

These several difficulties are of such concern that many potential purchasers of such articles will not purchase such articles while there is no answer to these several problems.

Attempts to solve this difficulty have encountered other difficulties so that at the present time it is considered that there is no satisfactory solution to the problem.

It has hitherto been the conventional technique to provide a plurality of outwardly extending lips which are secured conventionally by rivets such that these are considered to be permanently fixed to the perimeter of the louvre article.

The significant advantage of such an arrangement is that firstly such clips are economical to locate in position for a manufacturer, they can of course be affixed at the time of manufacture so that there is no difficulty in installation by an end user, and finally, the clips when in position allow for relative movement of the clips which can be caused by thermally caused expansion or contraction of the louvre article.

According to at least one object of this invention, there is proposed an arrangement that can be used to provide a better securement of louvre articles of the type discussed and to at least to some extent reduce some of the problems hitherto commented upon.

SUMMARY OF THE INVENTION

The invention accordingly can be said to reside in an attachment means for securing a louvre article comprised and of an integrally moulded article of plastic material, and adapted to extend across the external face of a rear window of a motor vehicle, comprising an attachment member including a lip portion and a support portion, the lip portion adapted to engage between and be held thereby, a resilient surround of the rear window of a motor vehicle and the external face of glass comprising the rear window of the motor vehicle, a lowermost face of the support portion adapted to be secured by adhesion to the external face of glass forming the rear window of the motor vehicle, the location and shape of the said lip portion and the said support portion being such as to co-operatively assist in affixing the attachment member to the external face of a rear window of a motor vehicle, the support portion further including a shape providing for interlocking engagement of a releasable member, the releasable member including a head, a shank, and a foot, the shape of the foot being such as to co-operatively engage said interlocking shape in the housing of the support portion and when passed through an aperture within the perimeter of a louvre unit as described, hold such louvre unit with respect to the attachment member.

A problem associated with permanently affixing a member to the external glass of the rear window of a motor vehicle is that its location has to be very accurately established, and this has to be established by persons who are unfamiliar with any method of installation such as a casual purchaser of a product who intends to install this on his motor vehicle.

The invention in a further form can reside in a method of affixing an external plastic moulded louvre article to a rear window of a motor vehicle which method includes the steps of aligning a louvre article as described in an intended affixing position adjacent the rear window, marking through a centre of each of a plurality of fixing apertures in the perimeter of the louvre article the rear window, affixing an attachment member having an aperture passing fully through a support portion of the attachment member such that the aperture is appropriately aligned with respect to the marking, and then affixing the louvre article adjacent the said rear window by having a releasable member having a head, a shank, and a foot, with the foot passing through the respective aperture in the perimeter of each louvre article and interlocking with the support portion of the attachment member.

It is presumed that such a method will take place when the louvre article is at a median ambient temperature so that with a central location of each shank with respect to an aperture within the perimeter of a louvre article, and either by resiliency of the components adequate clearance between the shank of the releasable member and the aperture through which it passes, there can be relative expansion or contraction of the louvre article with respect to the glass forming the rear window of the motor vehicle to which it is attached without undue stress on the attachment.

The invention in a further form can reside in the combination of a louvre article formed from plastic and affixed to the external side of a rear window of a motor vehicle, where at least one of the plurality of fixing locations has a fixing arrangement including attachment means including an attachment member and a releasable member, the attachment member having a lowermost surface adhering to the outer surface of glass of the rear window of the motor vehicle, and an outwardly extending lip having a lowermost surface substantially co-planar with the adhering surface, and the releasable member having a head, a shank, and a foot, the shank passing through an aperture in the perimter of the louvre article, the head being larger than the said aperture in the louvre perimeter and the foot interlocking with a housing portion of the attachment member the shank being of such a size and shape as compared to the aperture and otherwise being located such that the shank will allow significant lateral relative movement of the louvre article allowing for thermally induced expansion and contraction of the louvre article relative to the fixed location.

Preferably, the shank includes a portion or portions having a shape and size such as will pass through the respective aperture in the louvre article perimeter only when some effective relative pressure is applied.

This can be achieved by such a member having an interference fit with the aperture.

It is presumed that there would be a plurality of attachment locations around the perimeter of a louvre article and these can be either the only means securing the louvre article to the rear window of a motor vehicle or they can be used in conjunction with additional fixing means specifically, clips that can additionally be permanently secured to the perimeter of a louvre article and which while providing additional support will also allow for relative movement of the louvre article with respect to the rear window.

In a preferred arrangement, such permanently secured clips are located along a bottom edge of a louvre article and there are otherwise fixing means at the sides and at spaced apart locations along a top of a louvre article.

The above features and others will be further fully appreciated by subsequent description of a preferred embodiment and reference can also be made to the accompanying claims which further define the invention.

BRIEF DESCRIPTION OF THE DRAWINGS

Accordingly the preferred embodiment will now be described with the assistance of drawings in which FIG. 4 is a side elevation partly in schematic form, illustrating a step in the method of affixing a louvre article including centrally marking through an aperture within the perimeter of a louvre article, FIG. 5 illustrates the same cross section as in FIG. 4 wherein an attachment member has been located and affixed by adhesion to the external face of the glass of a rear window of a motor vehicle.

DESCRIPTION OF THE PREFERRED EMBODIMENTS

Figure 1:
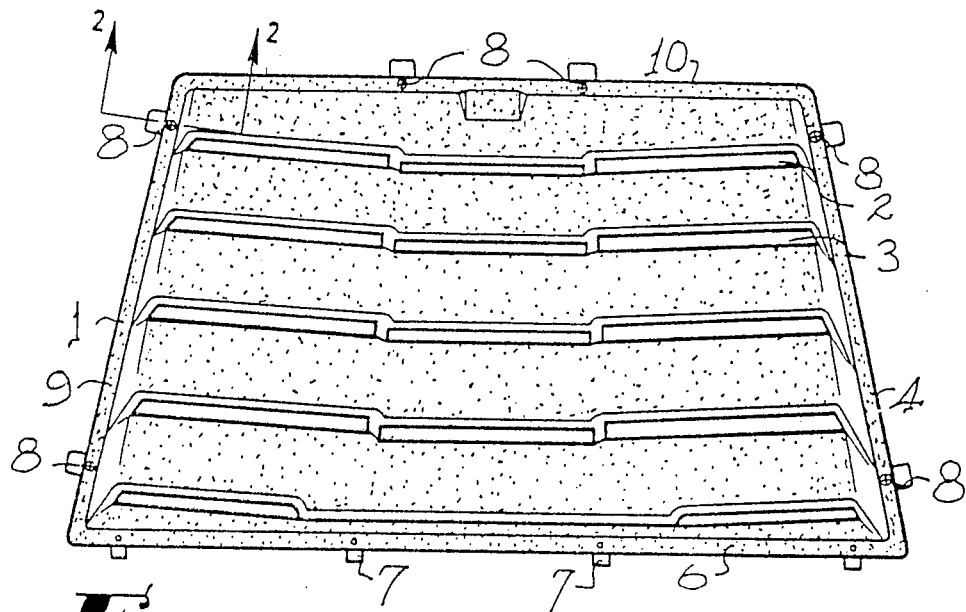
FIG. 1 illustrates a louvre article having according to this invention a plurality of affixing locations around its perimeter.
Figure 2:
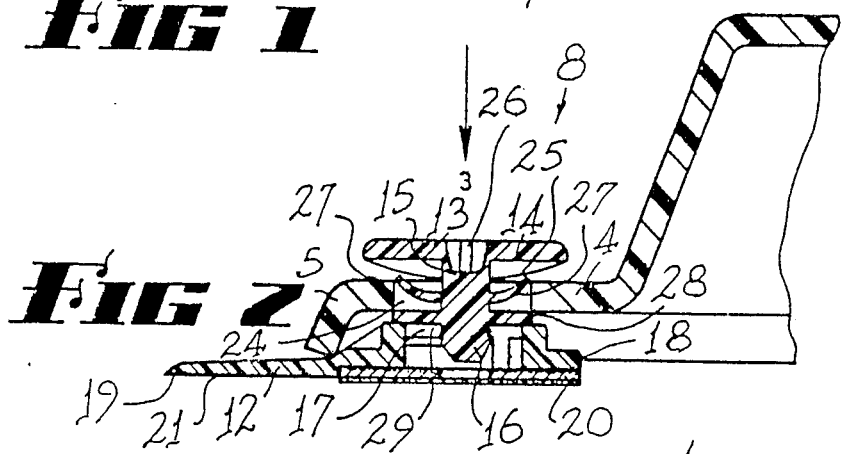
FIG. 2 is a cross section through a portion of the louvre article as shown in FIG. 1 along the line 2—2.
Figure 3:
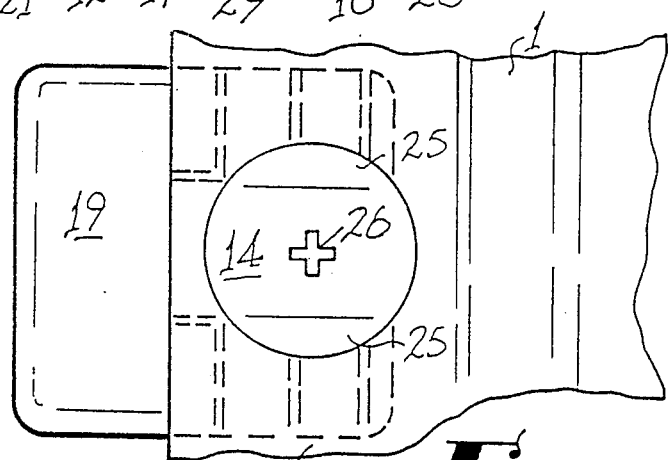
FIG. 3 is a view from above of the portion shown in FIG. 2.

Referring in particular to the drawings there is shown in FIGS. 1, 2 and 3 a louvre article 1 which is formed by using the technique of vacuum moulding a sheet of plastic of a type conventionally known as "A.B.S.".

The shape once formed, has then a plurality of apertures as is shown at 2 and 3 cut so as to thereby provide as is shown particularly in FIG. 1, five louvres integrally formed and with a common perimeter at 4.

The shape of the perimeter is more accurately seen in cross section in FIG. 2 and includes an outer downwardly depending lip portion 5.

Along a bottom edge 6 of the louvre article 1 are provided four clips 7 secured by rivets so as to be effectively permanently secured to the bottom perimeter of the louvre article 1.

It is understood that the overall shape and size of the louvre article 1 and particularly the perimeter of this is selected to co-incide with the perimeter of a rear window of a selected motor vehicle model and so that the perimeter 4 will generally be able to rest on the external face of the glass forming the rear window of the selected motor vehicle but contiguous with the elastomeric surround.

The outwardly extending tongue therefore of each of the clips 7 will be located so as to extend between the elastomeric surround and the external face of the glass beneath the elastomeric surround.

At spaced apart locations other than across the bottom that is on both sides and across the top, there are attachment means 8 there being two such attachment means on side 9 two along top 10 and two along side 11.

Each of these attachment means 8 includes an attachment member 12 and a releasable member 13.

The releasable member includes a head 14, a shank 15 and a foot 16.

The foot 16 includes two outwardly extending portions 17 which are adapted to interlock within the housing of the attachment member 12.

The attachment member 12 includes a support portion 18 and a lip portion 19.

Below the support portion 18 there is provided a double sided adhesive tape which provides thereby a lowermost adhesive surface which is substantially co-planar with the lowermost face 21 of the lip 19.

In this way, with the lip located as is shown in FIG. 5 between the elastomeric surround 22 and the glass 23 of the rear window of a motor vehicle, this reinforces the adherence of the adhesive to the external surface of the glass 23.

The releasable member 13 has a head 14 which is intended to be of such a diameter that it will not readily pass through an aperture 24 in the pertimeter 4.

Further, the head while being generally of planar proportion has two opposite ends slightly downwardly inclined shown at 25 the effect of this being that as the lowermost portion of the head engages the upper surface of the perimeter 4, there can be some resiliency by reason of deflection of the portion 25 with respect to the remainder of the head 14 and this can have the effect of more tightly clamping the releasable member with respect to the attachment member.

Passing from above through the centre of the head 14 is a symmetrically shaped star aperture 26 appropriate to be engaged by a Phillips head screw-driver.

The shank 15 has somewhat mid-way between the head 14 and the foot 16 four outwardly extending fingers 27 these being relatively thin and adapted thereby to deflect in the manner as is shown in FIG. 2 when being pushed through the aperture 24.

The effect of this is to provide resilient retention of the louvre article 1 so as to have each aperture 24 centrally located with each fixing location 8 but to have sufficient resiliency to allow these to expand or contract in relative terms especially when this is caused by heating or cooling of the louvre unit without forcing excessive pressure onto the attachment member and especially the affixing of this to the external surface of the glass 23.

Further along the shank 15 is an outwardly extending planar member of circular perimeteral shape shown at 28.

The external diameter shape is selected so as to have an interference fit with the similarly shaped aperture 24.

The effect of this is therefore that the releasable member 13 can effectively be pushed into the aperture 24 so that the planar member 28 pushes through with some force the aperture 24.

The releasable member therefore is substantially held with however pivotal freedom within the aperture 24 and to some extent under resilient pressure by reason of the portion 25 of the head 14.

At the lowermost end of the shank 15 is the foot 16 which is adapted in one orientation to pass through the aperture 29 and then to be rotated so as to interlock with each of the protruding members 17 below a further portion of the housing.

Figure 7:
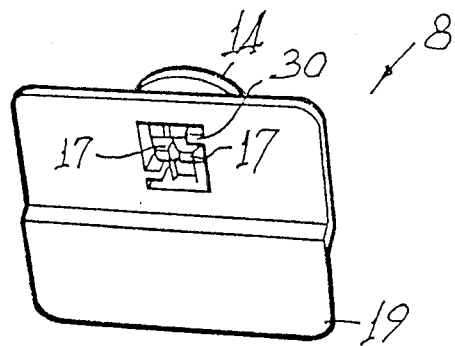
FIG. 7 is a view below the attachment member with the releasable member in an interlocking position.
Figure 8:
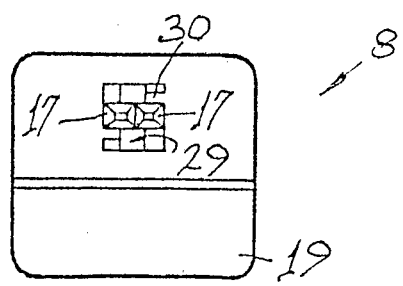
FIG. 8 is a view directly from below the affixing member as shown in FIG. 7.

This can be best seen in FIG. 7 and 8 where the portions 17 are shown especially in FIG. 8 in the interlocking position acting against stop protrusion 30 forming a portion of the housing.

There is a slightly protruding portion over which each of the members 17 must ride acting therefore to some extent as a detent causing the releasable member 13 to be held with some force in the fully interlocked position.

A significant factor in making this invention effective relates to the ability of being able to accurately locate the attachment means in such a way that this can be achieved by even the most inexperienced persons, and when achieved it will be effective for the purposes discussed.

One factor toward achieving this success is that subsequent to a marking being made such as using the technique shown in FIG. 4, the attachment member can be accurately located.

Figure 6:
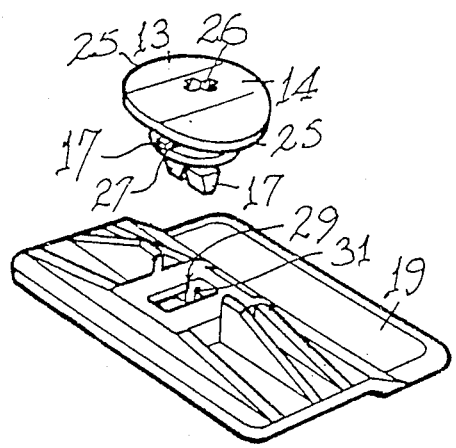
FIG. 6 is a perspective view of both the releasable member and attachment member being shown in exploded manner.

A factor toward this is that there is an aperture shown at 31 in FIG. 6 which passes fully through the attachment member including the underneath adhesion material and that this can then be located centrally over the marking.

Moreover, the releasable member 13 will then accurately locate with an aperture within the perimeter of the louvre article 1 while each of the attachment members is located with the marking as properly effected on the adhering surface is centrally located with respect to the aperture 31.

The method of affixing a louvre article according to this invention therefore includes firstly locating an appropriate louvre article for the rear window of a motor vehicle in the intended position for subsequent affixing.

It is presumed that apertures of an appropriate size have been already cut within the perimeter but obviously if this has not been done this must be effected the apertures being of circular perimeter shape and accurately of a size appropriate for the subsequent purpose of holding the releasable member.

With the louvre article 1 in such a position, a marking instrument is then used and is centrally aligned within each aperture for each fixing location and a mark is made on the external surface of the glass of the rear window.

It is to be noted that with the fixed clips in position these obviously would be fitted below the window surround during the marking period to simulate the final expected position of the louvre article.

Subsequently, each attachment member is then located with the tongue beneath the surround of the rear window but the location is of course of the rear window but the location is of course such that the aperture passing fully through the attachment member 12 in each case is such that the aperture is centrally over the marking previously made through the aperture of the perimeter of the louvre member 1.

Each attachment member 12 is then suitably glued into position either by using glue appropriately mixed at the time or an instant type adhesive where there is a peel away covering which is then effected to expose a suitable adhesive face.

Each of the attachment members 12 is then located appropriately and left sufficient time for the adhesion to be permanently effected.

It is then simply a matter of locating the louvre member in position and with each of the releasable member 13 already pressed through the respective apertures in the perimeter 4, these should then be turned appropriately with a Phillips head screw-driver while pressing down on the top of the head 14 thereby locking each of these in position.

In the embodiment described, both the attachment member and the releasable member are made by injection moulding of appropriate plastic.

The shape of the attachment member surrounding the housing is suitably ribbed and strengthened to provided sufficient strength for the purpose intended as is shown in the illustrations.

The result of the embodiment now described is that a louvre article of the type described can be more securely affixed to the rear window on its external side of a motor vehicle than has hitherto been the case and that such affixing means will genrally withstand normal environmental conditions caused for instance by the thermal expansion or contraction of the plastic of the louvre article as this is conventionally made and at the same time, by having recessed access apertures in the head of each releasable member, there is substantial deterrents to theft. Hitherto, a louvre article of the type described could simply be pulled with one single tug from the rear of a motor vehicle and it is now obviously necessary for the thief to at the very least have an appropriate instrument, and apply this consecutively around each of the fixing locations.

It will be noted that the use of a tongue or lip to fit below the elastomeric surround of the rear window of a motor vehicle helps to strengthen the location of each affixing location but in some vehicles such a method of affixing is not available where for instance the glass is terminated without having such a surround, and the invention is not intended in its broadest sense to be limited to only the case where a lip is used in conjunction with the affixing member.

Furthermore, the releasable member has been described where this protrudes into a housing within the attachment member.

The attachment member can in a further instance have a protruding leg which could typically be threaded, and the releasable member could comprise a nut screwably engaging such protruding member.

The point of having an aperture passing fully through the attachment member is to provide for locatability and provided the shape of the attachment member is such as to provide this either by way of an aperture fully passing through the attachment member or by an inset, this would nonetheless achieve the function and at least in the broadest sense of this invention it is not intended that the invention should necessarily be limited to merely an aperture.

I claim:

1. Attachment means for securing a louvre unit comprised of an integrally molded plastic material to the external face of a rear window assembly of a motor vehicle, the window assembly being of the kind which includes a glass portion and a resilient surround for the glass portion, said attachment means comprising an attachment member including a lip portion and a support portion, the lip portion adapted to engage between and be held by the resilient surround of the rear window assembly, and the external face of the glass portion, a lowermost face of the support portion adapted to be secured by adhesion to the external face of the glass portion, the location and shape of said lip portion and said support portion being such as to co-operatively assist in affixing the attachment member to the rear window assembly, the support portion further including an aperture for interlocking engagement of a releasable member, the releasable member including a head, a shank, and a foot, the shape of the foot being such as to pass through an aperture within the perimeter of a louvre unit and co-operatively engage said aperture in the support portion to secure said louvre unit with respect to the attachment member, the releasable member including outwardly extending portions adapted to engage with resilient resistance the sides of an aperture within the perimeter of the louvre unit.

2. Attachment means for securing a louvre unit comprised of an integrally molded plastic material to the external face of a rear window assembly of a motor vehicle, the window assembly being of the kind which includes a glass portion and a resilient surround for the glass portion, said attachment means comprising an attachment member including a lip portion and a support portion, the lip portion adapted to engage between and be held by the resilient surround of the rear window assembly, and the external face of the glass portion, a lowermost face of the support portion adapted to be secured by adhesion to the external face of the glass portion, the location and shape of said lip portion and said support portion being such as to co-operatively assist in affixing the attachment member to the rear window assembly, the support portion further including an aperture for interlocking engagement of a releasable member, the releasable member including a head, a shank, and a foot, the shape of the foot being such as to pass through an aperture within the perimeter of a louvre unit and co-operatively engage said aperture in the support portion to secure said louvre unit with respect to the attachment member, the releasable member having from its shank an outwardly extending portion adapted to pass only with interference fit through an aperture within the perimeter of the louvre unit.

3. An arrangement including a rear window louvre unit comprised of molded plastic and attached to the glass of a rear window assembly of a motor vehicle, the attachment being effected at at least two spaced apart locations around the perimeter of the louvre unit and including an attachment member secured by adhesion to the external face of the glass, a releasable member having a head, a shank and an interlocking foot passing through an aperture through the perimeter of the louvre unit, the foot interlocking with a housing within a support portion of an attachment, the shank of the releasable member including an outwardly extending portion of such a size and shape and so positioned that it will pass through only with interference, an aperture in the perimeter of the louvre unit, the shank being located through said aperture with said outwardly extending portion below the aperture, the head and said outwardly extending portion thereby holding between them the perimeter of the louvre.

4. An arrangement including a rear window louvre unit comprised of molded plastic and attached to the glass of a rear window assembly of a motor vehicle, the attachment being effected at at least two spaced apart locations around the perimeter of the louvre unit and including an attachment member secured by adhesion to the external face of the glass, a releasable member having a head, a shank and interlocking foot passing through an aperture through the perimeter of the louvre unit, the foot interlocking with a housing within a support portion of an attachment, the shank of the releasable member including an outwardly extending portion of such a size and shape and so positioned that it will pass through only with interference, outwardly extending fingers between the outwardly extending portion and the head, engaging and providing resilient retention of the shank with respect to the sides of the aperture, an aperture in the perimeter of the louvre units, the shank being located through said aperture with said outwardly extending portion below the aperture, the head and said outwardly extending portion thereby holding between them the perimeter of the louvre.

* * * * *